Jan. 15, 1957  R. F. E. STEGEMAN  2,777,361
SPECTACLE FRAME HAVING COMBINED METALLIC
AND NON-METALLIC PARTS
Filed Nov. 4, 1953
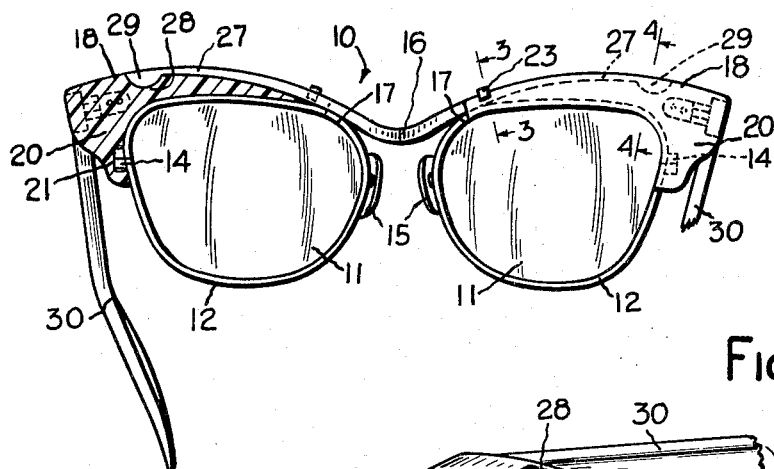
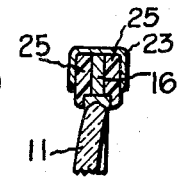
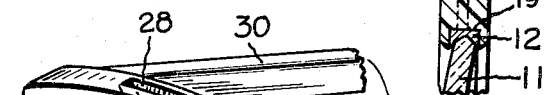
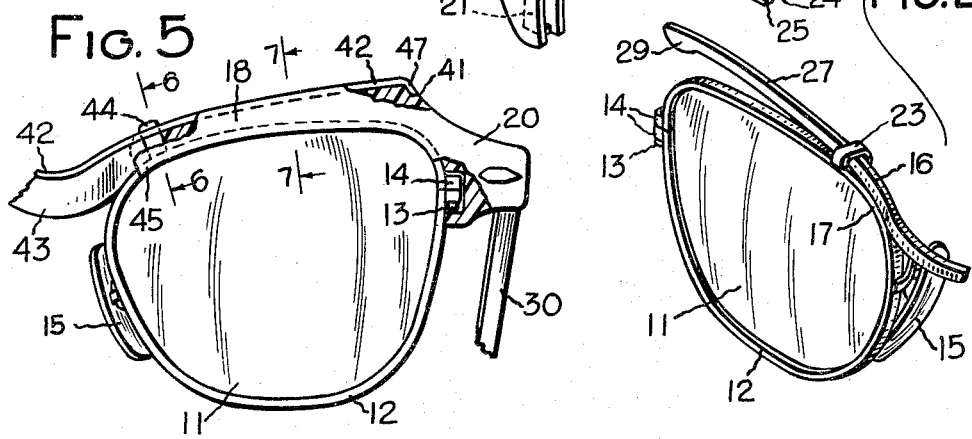
INVENTOR.
R. F. E. STEGEMAN
BY
ATTORNEY

United States Patent Office 2,777,361
Patented Jan. 15, 1957

2,777,361

SPECTACLE FRAME HAVING COMBINED METALLIC AND NON-METALLIC PARTS

Raymond F. E. Stegeman, Greece, N. Y., assignor to Bausch & Lomb Optical Company, Rochester, N. Y., a corporation of New York Application November 4, 1953, Serial No. 390,173

4 Claims. (Cl. 88—41)

This invention relates to spectacles and more particularly it has reference to a spectacle having a frame which is made of a combination of metallic and non-metallic parts.

One of the objects of my invention is to provide an improved spectacle of the type described having improved means for detachably securing the non-metallic parts to the metallic parts. Another object is to provide means for releasably holding non-metallic frame members which are mounted on metallic lens rims extending along the upper portions of the lenses so that the non-metallic members may be selectively removed without the use of tools. These and other objects and advantages reside in certain novel features of construction, arrangement and combination of parts as will hereinafter be more fully described and pointed out in the appended claims.

Referring to the drawings:

Fig. 1 is a front elevational view of a spectacle embodying my invention, with parts shown in section and one temple fragmentarily shown.

Fig. 2 is a fragmentary perspective view showing the metallic and non-metallic parts in separated relation.

Fig. 3 is a sectional view taken on line 3—3 of Fig. 1.

Fig. 4 is a sectional view taken on line 4—4 of Fig. 1.

Fig. 5 is a fragmentary view of a modified form of my invention with parts shown in section.

Fig. 6 is a sectional view taken on line 6—6 of Fig. 5.

Fig. 7 is a sectional view taken on line 7—7 of Fig. 5.

A preferred embodiment of my invention is shown in the drawings wherein 10 indicates, generally a spectacle having a pair of spaced lenses 11 held by surrounding metallic lens rims 12 which are split at their temporal portions and held together by screws 13 passing through lugs 14 carried by the respective ends of the rims. The usual nose pads 15 are carried by the nasal portions of the lens rims 12. A resilient metallic element 16 connects the lens rims 12 and is secured to the upper nasal portions 17 thereof, as by soldering, so as to hold the rims and lenses in spaced relation. The respective ends of the resilient element 16 extend along and above the lens rims 12 to points adjacent the temporal portions thereof.

A pair of non-metallic frame members 18, made of plastic material for example, are mounted on the upper portions of the lens rims 12 by means of grooves 19 which are formed in the undersides of the frame members 18 and receive the rims 12. The frame members 18 extend beyond the temporal sides of the lens rims 12 and have temporal extensions 20 which project downwardly along the temporal sides of the lens rims 12. The inner edges of the extensions 20 have recesses 21 which are in communication with the grooves 19 so that when the lens rims 12 are positioned in the grooves 19 the lugs 14 are located within the recesses 21 and are thereby concealed from view. Secured to the upper nasal portions of the lens rims 12, by soldering to the top edge of element 16, are the overhanging slideways 23. The nasal ends of the frame members 18 are slotted as shown at 24 to provide two spaced ends 25 which are slidably received under the overhanging slideway 23 with one end 25 on each side of the element 16.

The upper edges of the frame members 18 are provided with grooves 26 which receive the temporally extending portions 27 of the resilient element 16. Notches 28 are formed in the frame members 18 adjacent the temporal end of the grooves 26 so as to receive downwardly extending tongues 29 which are carried by the temporal ends of the resilient element 16. Since the resilient elements 16 are secured adjacent the nasal portions of the lens rims, fulcrum means are thereby provided so that the temporal ends of the resilient elements may be raised vertically against the resilience of the elements so as to remove the tongues 29 from the notches 28 and thereby permit the frame members 18 to be removed by sliding them outwardly in a temporal direction. The usual temples 30 are hingedly mounted to the temporal extensions 20 of the frame members 18 in the usual manner.

In the modifications shown in Figs. 5–7, the frame member 18 has on its upper edge a groove 40 which terminates at its temporal end in a notch 41. A resilient metallic element 42 is soldered to the bridge 43 and extends toward the temporal portion of the frame member 18 and underneath an overhanging projection or slideway 44 which is soldered to the upper edge of the lens rim 12. The nasal end of the frame member 18 is slotted so as to provide the two spaced portions 45 and 46, the latter of which is slidably held under the slideway provided by the overhanging projection 44. A downwardly extending tongue 47, carried at the temporal end of the resilient element 42, is normally held in the notch 41 by the resilience of the element. In this form of the invention, the overhanging member 44 provides fulcrum means whereby the resilient element 42 may be vertically flexed so as to remove the tongue 47 from the notch 41 and thereby permit the frame member 18 to be removed from the spectacle.

From the foregoing, it is apparent that I am able to attain the objects of my invention and provide improved means for releasably locking or holding a non-metallic frame member on a metallic lens rim. The removal of the frame member may be readily accomplished, since it is only necessary to lift the temporal ends of the resilient locking elements to remove the downwardly extending tongues from the notches and thereby permit the frame members to be slid off of the lens rims in a temporal direction. In this construction no screws are employed, yet the parts are firmly and detachably held together. Since the non-metallic frame members may be readily removed without the use of tools, it is possible to interchange the frame members 18 so that various ornamental effects may be provided. Various modifications can obviously be made without departing from the spirit of my invention as pointed out in the appended claims.

I claim:

1. In a spectacle having a lens rim extending along the upper edge of a lens, a non-metallic frame member having on its under side a groove in which the lens rim is positioned and a slideway carried by the rim adjacent the nasal portion thereof and in which the nasal end portion of the member is slidably received, the combination of means for releasably holding the frame member in the slideway comprising a resilient element positioned in a groove formed along the upper edge of the frame member, said element being carried by the lens rim adjacent the nasal portion of the rim, the frame member having a notch adjacent to the last-named groove and a projecting tongue carried at the temporal end of the element and normally held in the notch by the resilience of the element whereby the element may be flexed to withdraw the tongue from the notch for selectively releasing the frame member and permitting removal of the member from the lens rim.

2. In a spectacle having a lens rim extending along the upper edge of a lens and a non-metallic frame member having on its under side a groove in which the rim is positioned, the combination of means for detachably holding the frame member on the lens rim comprising a slideway carried by the nasal portion of the lens rim in overhanging relation thereto, the nasal end of the frame member being slidably positioned under the slideway, the upper edge of the frame member having a groove with a connecting notch adjacent the temporal end thereof, a resilient element positioned in the last-named groove, a downwardly extending tongue on the temporal end of the element, the tongue being normally positioned in said notch, fulcrum means carried by the nasal portion of the lens rim and engaging the nasal portion of the element whereby the free temporal end thereof may be flexed vertically to releasably engage the tongue in the notch for detachably holding the frame member on the lens rim.

3. In a spectacle, the combination of a metallic rim surrounding a lens, said rim being split at its temporal side, a pair of lugs secured to the respective ends of the split rim and means for holding the lugs together, a non-metallic frame member extending along the top of the rim from a point adjacent the nasal portion thereof to a point below the lugs on the temporal portion of the rim, said frame member having a groove in which the rim is seated and a recess in which the lugs are positioned, an overhanging slideway located at the top portion of the rim adjacent the nasal portion thereof, said slideway being carried by a projection which extends upwardly from the outer surface of the rim, the nasal end of the frame member being in slidable engagement with the slideway, the nasal end of the frame member having a slot within which said projection is slidably received, and means for releasably holding the frame member on the rim comprising a resilient element extending along the top of the frame member, said element having a downwardly extending tongue coacting with a notch on the frame member whereby the latter is releasably held against movement away from the slideway.

4. A spectacle comprising a pair of spaced metal lens rims surrounding a pair of lenses, a resilient metallic element connecting the nasal upper portions of the lens rims and extending above and outwardly towards the temporal portions of the lens rims, a pair of non-metallic frame members having on their under edges grooves in which the upper portions of the respective lens rims are positioned, said frame members extending from the nasal portions to points beyond the temporal portions of the lens rims, slideways carried by the upper parts of the lens rims adjacent the nasal portions thereof, the nasal ends of the frame members being slidably mounted in the slideways, the upper edges of the frame members having grooves in which the element is positioned, said members also having notches adjacent the temporal ends of said last-named grooves, tongues carried by the temporal ends of the element, said tongues being normally positioned in the notches and held therein by the resilience of the element whereby the frame members can be selectively removed from the rims by moving the tongues out of the notches and thereby permitting the frame members to be slid off the lens rims and temples hingedly carried by the temporal portions of the frame members.

References Cited in the file of this patent

UNITED STATES PATENTS

| | | |
|---|---|---|
| 1,293,671 | Beattey | Feb. 11, 1919 |
| 1,330,819 | Propson | Feb. 17, 1920 |
| 2,577,380 | Stegeman | Dec. 4, 1951 |
| 2,599,074 | Stegeman | June 3, 1952 |
| 2,682,199 | Weissman | June 29, 1954 |
| 2,703,036 | Splaine | Mar. 1, 1955 |
| 2,749,800 | Gagnon | June 12, 1956 |
| 2,752,820 | Lindblom | July 3, 1956 |